United States Patent
Cai et al.

(10) Patent No.: US 12,469,074 B2
(45) Date of Patent: Nov. 11, 2025

(54) SYSTEMS AND METHODS FOR PROCESSING INTER-DEPENDENT DATA FOR RISK MODELLING AND ANALYSIS

(71) Applicant: Bank of Montreal, Toronto (CA)

(72) Inventors: Yangming Chris Cai, Toronto (CA); Sriram Rajaram, Toronto (CA)

(73) Assignee: Bank of Montreal, Toronto (CA)

( * ) Notice: Subject to any disclaimer, the term of this patent is extended or adjusted under 35 U.S.C. 154(b) by 65 days.

(21) Appl. No.: 17/890,897

(22) Filed: Aug. 18, 2022

(65) Prior Publication Data
US 2023/0068947 A1 Mar. 2, 2023

Related U.S. Application Data

(60) Provisional application No. 63/237,881, filed on Aug. 27, 2021.

(51) Int. Cl.
*G06F 16/20* (2019.01)
*G06F 16/22* (2019.01)
*G06F 16/28* (2019.01)
*G06Q 40/03* (2023.01)

(52) U.S. Cl.
CPC ......... *G06Q 40/03* (2023.01); *G06F 16/2282* (2019.01); *G06F 16/285* (2019.01)

(58) Field of Classification Search
CPC .... G06Q 40/03; G06F 16/2282; G06F 16/285
See application file for complete search history.

(56) References Cited

U.S. PATENT DOCUMENTS

| | | | |
|---|---|---|---|
| 2013/0346274 A1* | 12/2013 | Ferdinand | G06Q 40/04 705/37 |
| 2019/0095390 A1* | 3/2019 | Gould | G06F 16/2452 |
| 2021/0089537 A1* | 3/2021 | Hanson | G06F 16/221 |

\* cited by examiner

*Primary Examiner* — Khanh B Pham
*Assistant Examiner* — Samuel C Sharpless, III
(74) *Attorney, Agent, or Firm* — Foley & Lardner LLP

(57) ABSTRACT

A system for processing data items may include one or more memories and one or more processors. The one or more memories may be configured in a first logical table including a plurality of logical rows and a plurality of logical columns. A value of a data item in a first logical column in each logical row may be determined based on a dependency of the first logical column on a second logical column in another logical row. The one or more processors may configure at least the first and second logical columns of the first logical table into a first logical array of data items, determine, by executing a first execution unit, values of the data items in the first logical array using the dependency, and convert, by executing the first execution unit, the first logical array with the determined values into a second logical table.

18 Claims, 6 Drawing Sheets

| | C1 421 month | C2 422 interest rate | C3 423 start balance | C4 424 scheduled payment | C5 425 interest paid | C6 426 amortized amount | C7 427 end balance |
|---|---|---|---|---|---|---|---|
| R1 411 | 1 | 0.1189% | 1,832,066.78 | 7,165.08 | 2,178.20 | 4,986.89 | 1,827,079.89 |
| R2 412 | 2 | 0.1213% | | | | | |
| R3 413 | 3 | 0.1216% | | | | | |
| R4 414 | 4 | 0.1217% | | | | | |
| R5 415 | 5 | 0.1222% | | | | | |

410

| | | | | | | | |
|---|---|---|---|---|---|---|---|
| R1 411 | 1 | 0.1189% | 1,832,066.78 | 7,165.08 | 2,178.20 | 4,986.89 | 1,827,079.89 |
| R2 412 | 2 | 0.1213% | 1,827,079.89 | 7,190.00 | 2,216.60 | 4,973.41 | 1,822,106.48 |
| R3 413 | 3 | 0.1216% | | | | | |
| R4 414 | 4 | 0.1217% | | | | | |
| R5 415 | 5 | 0.1222% | | | | | |

450

⋮

| | | | | | | | |
|---|---|---|---|---|---|---|---|
| R1 411 | 1 | 0.1189% | 1,832,066.78 | 7,165.08 | 2,178.20 | 4,986.89 | 1,827,079.89 |
| R2 412 | 2 | 0.1213% | 1,827,079.89 | 7,190.00 | 2,216.60 | 4,973.41 | 1,822,106.48 |
| R3 413 | 3 | 0.1216% | 1,822,106.48 | 7,193.15 | 2,216.15 | 4,977.00 | 1,817,129.48 |
| R4 414 | 4 | 0.1217% | 1,817,129.48 | 7,193.91 | 2,211.45 | 4,982.46 | 1,812,147.02 |
| R5 415 | 5 | 0.1222% | 1,812,147.02 | 7,199.40 | 2,215.15 | 4,984.25 | 1,807,162.77 |

490

| | C1 121 month | C2 122 interest rate | C3 123 start balance | C4 124 scheduled payment | C5 125 interest paid | C6 126 amortized amount | C7 127 end balance |
|---|---|---|---|---|---|---|---|
| R1 111 | 1 | 0.1189% | 1,832,066.78 | 7,165.08 | 2,178.20 | 4,986.89 | 1,827,079.89 |

110 ↗

| | C1 | C2 | C3 | C4 | C5 | C6 | C7 |
|---|---|---|---|---|---|---|---|
| R1 111 | 1 | 0.1189% | 1,832,066.78 | | 2,178.20 | 4,986.89 | 1,827,079.89 |
| R2 112 | 2 | 0.1213% | 1,827,079.89 | 7,190.00 | 2,216.60 | 4,973.41 | 1,822,106.48 |
| R3 113 | 3 | 0.1216% | 1,822,106.48 | 7,193.15 | 2,216.15 | 4,977.00 | 1,817,129.48 |
| R4 114 | 4 | 0.1217% | 1,817,129.48 | 7,193.91 | 2,211.45 | 4,982.46 | 1,812,147.02 |
| R5 115 | 5 | 0.1222% | =C7 (R4) | =C2*(C3+(C3/((1+C3)^(305-C1+1)-1))) | =C3*C2 | =C4-C5 | =C3-C6 |
| | | | 143 | 144 | 145 | 146 | 147 |

|        | C1 421 month | C2 422 interest rate | C3 423 start balance | C4 424 scheduled payment | C5 425 interest paid | C6 426 amortized amount | C7 427 end balance |
|--------|--------------|----------------------|----------------------|--------------------------|----------------------|-------------------------|--------------------|
| R1 411 | 1            | 0.1189%              | 1,832,066.78         | 7,165.08                 | 2,178.20             | 4,986.89                | 1,827,079.89       |
| R2 412 | 2            | 0.1213%              |                      |                          |                      |                         |                    |
| R3 413 | 3            | 0.1216%              |                      |                          |                      |                         |                    |
| R4 414 | 4            | 0.1217%              |                      |                          |                      |                         |                    |
| R5 415 | 5            | 0.1222%              |                      |                          |                      |                         |                    |

↙ 410

|        | C1 421 month | C2 422 interest rate | C3 423 start balance | C4 424 scheduled payment | C5 425 interest paid | C6 426 amortized amount | C7 427 end balance |
|--------|--------------|----------------------|----------------------|--------------------------|----------------------|-------------------------|--------------------|
| R1 411 | 1            | 0.1189%              | 1,832,066.78         | 7,165.08                 | 2,178.20             | 4,986.89                | 1,827,079.89       |
| R2 412 | 2            | 0.1213%              | 1,827,079.89         | 7,190.00                 | 2,216.60             | 4,973.41                | 1,822,106.48       |
| R3 413 | 3            | 0.1216%              |                      |                          |                      |                         |                    |
| R4 414 | 4            | 0.1217%              |                      |                          |                      |                         |                    |
| R5 415 | 5            | 0.1222%              |                      |                          |                      |                         |                    |

↙ 450

...

|        | C1 421 month | C2 422 interest rate | C3 423 start balance | C4 424 scheduled payment | C5 425 interest paid | C6 426 amortized amount | C7 427 end balance |
|--------|--------------|----------------------|----------------------|--------------------------|----------------------|-------------------------|--------------------|
| R1 411 | 1            | 0.1189%              | 1,832,066.78         | 7,165.08                 | 2,178.20             | 4,986.89                | 1,827,079.89       |
| R2 412 | 2            | 0.1213%              | 1,827,079.89         | 7,190.00                 | 2,216.60             | 4,973.41                | 1,822,106.48       |
| R3 413 | 3            | 0.1216%              | 1,822,106.48         | 7,193.15                 | 2,216.15             | 4,977.00                | 1,817,129.48       |
| R4 414 | 4            | 0.1217%              | 1,817,129.48         | 7,193.91                 | 2,211.45             | 4,982.46                | 1,812,147.02       |
| R5 415 | 5            | 0.1222%              | 1,812,147.02         | 7,199.40                 | 2,215.15             | 4,984.25                | 1,807,162.77       |

| | C1 521 month | C2 522 interest rate | C3 523 start balance | C4 524 scheduled payment | C5 525 interest paid | C6 526 amortized amount | C7 527 end balance |
|---|---|---|---|---|---|---|---|
| R1 511 | 1 | 0.1189% | 1,832,066.78 | 7,165.08 | 2,178.20 | 4,986.89 | 1,827,079.89 |
| R2 512 | 2 | 0.1213% | | | | | |
| R3 513 | 3 | 0.1216% | | | | | |
| R4 514 | 4 | 0.1217% | | | | | |
| R5 515 | 5 | 0.1222% | | | | | |

530

| | C1 521 month | interest rate | start balance | scheduled payment | interest paid | amortized amount | end balance |
|---|---|---|---|---|---|---|---|
| | | | | C8 528 array column A[1]-A[30] 535 | | | |
| R1 531 | 1 | 0.1189% | 1,832,066.78 | | | | |
| | | 0.1213% | 1,832,066.78 | | | | |
| | | 0.1216% | 1,832,066.78 | | | | |
| | | 0.1217% | 1,832,066.78 | | | | |
| | | 0.1222% | 1,832,066.78 | | | | |

550

| | C1 521 month | interest rate | start balance | scheduled payment | interest paid | amortized amount | end balance |
|---|---|---|---|---|---|---|---|
| | | | | C8 528 array column A[1]-A[30] 535 | | | |
| R1 531 | 1 | 0.1189% | 1,832,066.78 | 7,165.08 | 2,178.20 | 4,986.89 | 1,827,079.89 |
| | | 0.1213% | 1,832,066.78 | 7,190.00 | 2,216.60 | 4,973.41 | 1,822,106.48 |
| | | 0.1216% | 1,832,066.78 | 7,193.15 | 2,216.15 | 4,977.00 | 1,817,129.48 |
| | | 0.1217% | 1,832,066.78 | 7,193.91 | 2,211.45 | 4,982.46 | 1,812,147.02 |
| | | 0.1222% | 1,832,066.78 | 7,199.40 | 2,215.15 | 4,984.25 | 1,807,162.77 |

570

| | C1 521 month | C2 522 interest rate | C3 523 start balance | C4 524 scheduled payment | C5 525 interest paid | C6 526 amortized amount | C7 527 end balance |
|---|---|---|---|---|---|---|---|
| R1 511 | 1 | 0.1189% | 1,832,066.78 | 7,165.08 | 2,178.20 | 4,986.89 | 1,827,079.89 |
| R2 512 | 2 | 0.1213% | 1,827,079.89 | 7,190.00 | 2,216.60 | 4,973.41 | 1,822,106.48 |
| R3 513 | 3 | 0.1216% | 1,822,106.48 | 7,193.15 | 2,216.15 | 4,977.00 | 1,817,129.48 |
| R4 514 | 4 | 0.1217% | 1,817,129.48 | 7,193.91 | 2,211.45 | 4,982.46 | 1,812,147.02 |
| R5 515 | 5 | 0.1222% | 1,812,147.02 | 7,199.40 | 2,215.15 | 4,984.25 | 1,807,162.77 |

Fig. 5

SYSTEMS AND METHODS FOR PROCESSING INTER-DEPENDENT DATA FOR RISK MODELLING AND ANALYSIS

CROSS-REFERENCE TO RELATED APPLICATION

This application claims priority to U.S. Provisional Patent Application No. 63/237,881, filed Aug. 27, 2021, which is incorporated by reference in its entirety for all purposes.

TECHNICAL FIELD

This application is generally directed towards a data processing system, and more specifically towards systems and methods for processing inter-dependent data stored in a logical table using a logical array.

BACKGROUND

A statistical analysis system (e.g., statistical analysis software) can retrieve data from a variety of sources (e.g., relational database) and perform statistical analysis on it. One method to process data for statistical analysis is a row-by-row data processing. There is a need for efficiently processing data in a case that contents of the current row are dependent on contents of a previous row. For example, because the rows in a table are not processed together in the same thread and their order is not guaranteed, even multi-threading may not significantly improve performance of processing inter-dependent data.

An analytics engine for large-scale data processing can spread both data and computations over clusters to achieve a substantial performance increase. One method to spread data over clusters is to organize a distributed collection of data into partitions of a relational database. There is a need for efficiently spreading data over clusters in a case that contents of the current row are dependent on contents of a previous row.

SUMMARY

Disclosed herein are systems and methods capable of addressing the above described shortcomings and may also provide any number of additional or alternative benefits and advantages. Embodiments described herein provide for systems and methods that process inter-dependent data stored in a logical table using a logical array.

In an embodiment, a method of processing data items is disclosed. The data items may be stored in one or more memories configured in a first logical table including a plurality of logical rows and a plurality of logical columns. A value of a data item in a first logical column in each logical row may be determined based on a dependency of the first logical column on a second logical column in another logical row. The method may include configuring, by one or more processors, at least the first and second logical columns of the first logical table into a first logical array of data items. The method may include determining, by the one or more processors executing a first execution unit, values of the data items in the first logical array using the dependency. The method may include converting, by the one or more processors executing the first execution unit, the first logical array with the determined values into a second logical table including a plurality of logical rows and a plurality of logical columns.

In another embodiment, a system for processing data items may include one or more memories and one or more processors. The one or more memories may be configured in a first logical table including a plurality of logical rows and a plurality of logical columns. A value of a data item in a first logical column in each logical row may be determined based on a dependency of the first logical column on a second logical column in another logical row. The one or more processors may be configured to configure at least the first and second logical columns of the first logical table into a first logical array of data items. The one or more processors may be configured to determine, by executing a first execution unit, values of the data items in the first logical array using the dependency. The one or more processors may be configured to convert, by executing the first execution unit, the first logical array with the determined values into a second logical table including a plurality of logical rows and a plurality of logical columns.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

FIG. 1 is a diagram depicting an example processing of inter-dependent data.

FIG. 4 is a diagram depicting an example processing of inter-dependent data, according to an embodiment.

FIG. 5 is a diagram depicting another example processing of inter-dependent data, according to an embodiment.

DETAILED DESCRIPTION

Figure 2:
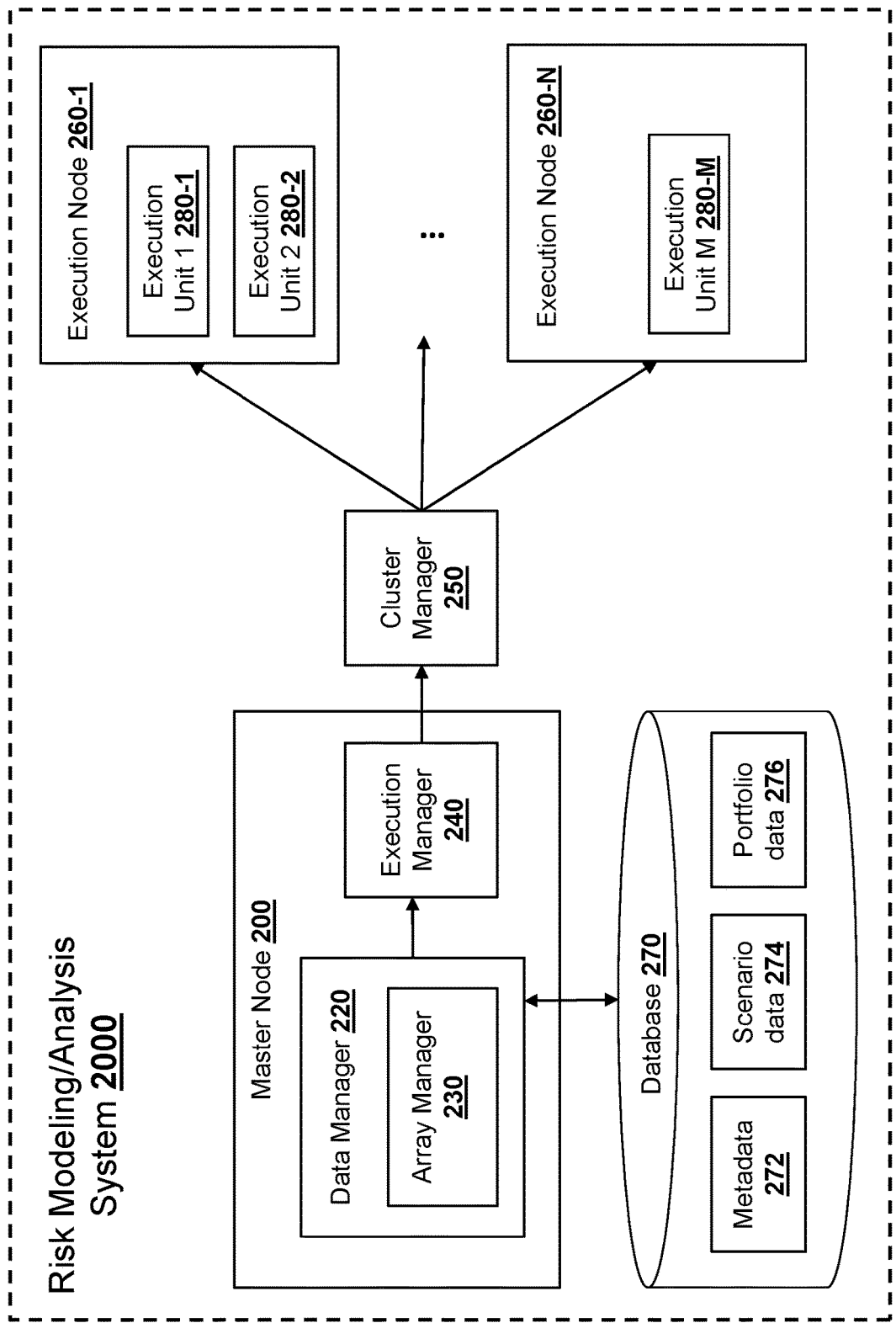
FIG. 2 is a block diagram showing a system for risk modelling and analysis, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to systems and methods that process inter-dependent data stored in a logical table using a logical array. Embodiments disclosed herein describe a system for processing data items, which may include one or more memories and one or more processors. The one or more memories may be configured in a first logical table including a plurality of logical rows and a plurality of logical columns. A value of a data item in a first logical column in each logical row may be determined based on a dependency of the first logical column on a second logical column in another logical row. The one or more processors may be configured to configure at least the first and second logical columns of the first logical table into a first logical array of data items. The one or more processors may be configured to determine, by executing a first execution unit, values of the data items in the first logical array using the dependency. The one or more processors may be configured to convert, by executing the first execution unit, the first logical array with the determined values into a second logical table including a plurality of logical rows and a plurality of logical columns.

One problem relates to efficiently processing inter-dependent data for risk modelling and/or analysis. For example, a loan amortization can be calculated for credit risk modelling and/or analysis using a logical table in which each row represents data relating to a loan amortization (e.g., interest rates, scheduled payment, amortized amount) for each month and the current month's amortization data (e.g., the current month's start balance) depends on the last month's amortization data (e.g., the previous month's end balance). In this case, statistical analysis software can start from one row and then iterate each month based on given formula. In some case, statistical analysis software may need to go back to the last month's data and then determine this month's data.

FIG. 1 is a diagram depicting an example processing of inter-dependent data. Statistical analysis software may calculate a loan amortization by performing row-by-row processing on a logical table whose rows represent monthly loan amortization schedules. The logical table has a plurality of columns 121-127 including C1 (month), C2 (interest rate), C3 (start balance), C4 (scheduled payment), C5 (interest paid), C6 (amortized amount), and C7 (end balance). The logical table has a plurality of rows R1, R2, R3, R4, and R5, which correspond to month 1, month 2, month 3, month 4, and month 5, respectively. This loan amortization schedule table has a time-series dependency 143 such that the start balance for the next month is dependent from the end balance of the current month. For example, start balance on month 5 (C3 of R5) is dependent on end balance from month 4 (C7 of R4), which in turn is dependent on end balance from month 3 (C7 of R3). This loan amortization schedule table also has other dependencies 144, 145, 146, 147 such that C4 (scheduled payment), C5 (interest paid), C6 (amortized amount), and C7 (end balance) of the current month depend on C3 (start balance) of the same month, which in turn is dependent on C7 (end balance) of the previous month. As shown in FIG. 1, statistical analysis software may input R1 (111) (see an input table view 110) and iterate each month based on given formula or dependencies (143, 144, 145, 146, 147) to output R1 (111), R2 (112), R3 (113), R4 (114), and R5 (115) (see an output table view 130). In this case, even if multi-threading is used, because the rows in a table are not processed together in the same thread and their order is not guaranteed, multithreading does not significantly improve performance of processing inter-dependent data. Therefore, there is a need for efficiently processing data in a case that contents of the current row are dependent on contents of a previous row.

Moreover, credit risk modelling/analysis are often performed with large credit data based on a number of credit risk metrics in multiple scenarios. For example, credit data may include scenario data and/or risk portfolio data. Credit risk metrics may include metrics for (1) stress testing (macro-stress testing (MST), comprehensive capital analysis and review (CCAR)), (2) regulatory capital (e.g., risk-weighted assets (RWA), (3) expected credit losses (ECL) allowance, (4) advanced internal rating-based (AIRB), (5) International Financial Reporting Standard (e.g., IFRS 9), (6) probability of default (PD) Models, and (7) loss given default (LGD) models. Test results with particular statistical analysis software showed that there is a need for efficiently performing credit risk modelling/analysis with large credit data based on these multiple credit risk metrics in multiple scenarios. For example, when the statistical analysis software monthly processed more than 11 million records of risk portfolio data (e.g., data relating to loans, credit cards, lines of credits, etc.) and data relating to more than $930 billion in exposure at default (EAD), its run time was 22 to 24 hours. When the statistical analysis software performed a stress testing with 15 PD models, 14 LGD models, and one scenario and 12 quarters of forecast, its run time with 120 GB data was more than 13 hours. When the statistical analysis software performed an IFRS 9 processing with 18 PD models, 6 LGD models, 3 scenarios and 15 years of forecast, its run time with 1.5 TB data was between 11-13 hours. In order to efficiently and economically process these large credit data and complex credit risk metrics, there is a need for developing or introducing specialized/dedicated components in a credit risk modelling/analysis system and/or utilizing cloud and open source platforms.

To solve these problems, according to certain aspects, embodiments in the present disclosure relate to techniques for performing a column-wise calculation, instead of a row-wise calculation, on inter-dependent data (e.g., time-series data having a time-series inter-dependency, as shown in FIG. 1) for improved performance (e.g., fast processing) of calculating inter-dependent time series data. In some embodiments, a risk modelling and analysis system can process inter-dependent time-series data (e.g., time-series data in one row depending on time-series data in another row as shown in FIG. 1) by converting a plurality of columns, in which data in one or more columns in one row depend on data in one or more columns in another row, into a logical array as a single column. In some embodiments, a risk modelling and analysis system can convert a plurality of columns in to a logical array using one or more user-defined functions (UDFs). A user of the system can define routines that process on one or more rows using UDFs. Upon converting column data into a logical array, the system can perform a calculation with the array so as to separately handle or process inter-dependent portions (e.g., column data that is subject to dependency between rows) using the array. In some embodiments, upon completion of the calculation with the array, the system can convert the (updated) array back to the plurality of columns and rows in the original table using an explode function. The system may use an explode function to map elements of the array to data in corresponding columns and rows. In some embodiments, an explode function can (1) map elements of the array to a plurality of rows having respective (key, value) pairs and then (2) map the (key value) pairs to data in corresponding columns and rows in the original table.

According to certain aspects, embodiments in the present disclosure relate to techniques for processing inter-dependent time series data in a logical table using an array UDF and an explode function in a risk modelling and analysis system, which is implemented with a unified analytics engine for large-scale data processing. In some embodiments, the unified analytics engine is open source software, which can be run in a cloud computing system. In some embodiments, the unified analytics engine can spread or distribute both data and computations over clusters in columns or partitions, and perform a column-by-column operation to achieve a substantial performance increase. The risk modelling and analysis system can (1) pre-populate one column with data (e.g., variable interest rates) using an array, (2) perform a calculation on the array based on a time-series dependency by performing a column-by-column operation, and (3) use an explode function to output time series data (based on the calculation results in the array) according to an original schema (e.g., columns and rows) of the logical table. In some embodiments, the system can run calculations relating to time-series dependency in an array using a UDF without iterating over rows multiple times. In performing the time-series dependent calculations, the system can take advantage of distributed computations over a cluster of computing nodes. In some embodiments, the system can assign the time-series dependent calculations to a computing node so that the computing node can execute the calculations in a dedicated execution unit in the same computing node (e.g., a task executed in a working node). In some embodiments, the system can assign calculations that are not subject to the time-series dependent calculations, to an execution unit other than the execution unit dedicated to the dependent calculations. For example, instead of iterating time-series over rows and performing calculations with reference to other rows, the system can generate, as an input, a single row with a column of an array type, and then perform all calculations in the array column. After the array calculations are completed, the system can use an explode function to expand the input to a time-series output. In this manner, a test result showed that the runtime of processing inter-dependent data using an array and an explode function is 20 seconds compared to the runtime of 3 minutes and 20 seconds when the same data are processed without using an array or an explode function.

In some embodiments, inter-dependent data processing can be performed using column-by-column operations without using an array or an explode function. For example, a risk modelling and analysis system can (1) pre-populate multiple rows with non-time-series dependent data (e.g., variable interest rates), and (2) perform column-by-column operations to calculate values in the rows (e.g., the start balance and end balance for each month) based on a time-series dependency. In this manner, the system can achieve performance improvement over inter-dependent data processing by row-by-row operations without spreading data/computation over a cluster of computing nodes (e.g., data processing shown in FIG. 1). However, this does not achieve better performance than inter-dependent data processing using an array or an explode function, because the system still needs to iterate through the rows 5 times, calculate inter-dependent values (e.g., the start balance and end balance for each month) one by one, which is not as efficient as performing inter-dependency calculations using an array.

According to certain aspects, a system for processing data items may include one or more memories and one or more processors. The one or more memories may be configured in a first logical table including a plurality of logical rows and a plurality of logical columns. A value of a data item in a first logical column in each logical row may be determined based on a dependency of the first logical column on a second logical column in another logical row. The one or more processors may be configured to configure at least the first and second logical columns of the first logical table into a first logical array of data items. The one or more processors may be configured to determine, by executing a first execution unit, values of the data items in the first logical array using the dependency. The one or more processors may be configured to convert, by executing the first execution unit, the first logical array with the determined values into a second logical table including a plurality of logical rows and a plurality of logical columns.

The one or more processors may be configured to determine the values of the data items in the first logical array by executing a user defined function. The one or more processors may be configured to convert the first logical array with the determined values into the second logical table by executing an explode function.

The one or more processors may be further configured to determine, by executing a second execution unit different from the first execution unit, values of data items in a third logical column of the first logical table, which are not subject to the dependency. The first execution unit and the second execution unit may be executed in parallel. The first execution unit and the second execution unit may be executed on different nodes in a cluster of computers.

The dependency may further include a dependency of a fourth logical column on the first logical column in the same logical row. In configuring the at least the first and second logical columns into the first logical array, the one or more processors may be configure at least the first, second and fourth logical columns of the first logical table into the first logical array of data items.

The data items in the first logical table may include time-series data. Data items in the plurality of rows of the first logical table may be associated with different time points from each other. The values of the data items in the first logical array determined using the dependency may include values relating to a loan amortization process.

Embodiments in the present disclosure may have the following advantages. First, some embodiments can provide useful techniques for efficiently processing inter-dependent data in a logical table using a logical array without iterating over multiple rows to calculate values based on the dependency. For example, the runtime for inter-dependent calculations using a logical array is, for example, more than 12 times efficient compared to row-by-row data processing without using a logical array (e.g., 45 minutes compared to 9.5 hours). A risk modelling/analysis system according to some embodiments can achieve this performance by (1) utilizing "in-memory" calculations using an array, (2) decomposing calculations into patterns based on inter-dependency of data (e.g., separating inter-dependent columns and non-inter-dependent columns), and (3) utilizing parallel and distributed calculations over a cluster of computing nodes so as to scale better as the data volume grows.

Second, some embodiments may provide useful techniques for efficiently processing inter-dependent data in a logical table using a logical array while still providing the (same) calculation results in the same format as row-by-row data processing without using a logical array. For example, a system according to some embodiments can use an explode function to output time series data (based on the calculation results in the array) according to an original schema (e.g., columns and rows) of the logical table.

FIG. 2 is a block diagram showing a system for risk modelling and analysis, according to some embodiments. A risk modelling and analysis system 2000 may include a master node 200, a database 270, a cluster manager 250, and a cluster of execution nodes 260-1 through 260-N(N is a positive integer greater than 1). In some embodiments, the master node 200, the cluster manager 250, and the execution nodes 260-1 through 260-N may be implemented in one or more computing systems each having similar configuration as that of the computing system 300 (see FIG. 3).

The master node 200 (core node or driver node) may be configured to create and process a distributed dataset or a distributed collection of data by partitioning data into partitions or columns of data and allocating the partitions or columns to one or more execution nodes. The partitions or columns can be run in parallel thereby improving performance of processing of large data. The database 270 may store metadata 272, scenario data 274, and/or portfolio data 276. The metadata 272 may include data relating to structure of the scenario data or the portfolio data stored in the database. For example, the metadata 272 may include data relating to entities and relationships (e.g., a logical table structure or a schema of a relational database) represented by the scenario data or the portfolio data stored in the database. The portfolio data 276 may include risk portfolio data (e.g., data relating to loans, credit cards, lines of credits, etc.) and data relating to credit risk metrics. The credit risk metrics may include metrics for (1) stress testing (macro-stress testing (MST), comprehensive capital analysis and review (CCAR)), (2) regulatory capital (e.g., risk-weighted assets (RWA), (3) expected credit losses (ECL) allowance, (4) advanced internal rating-based (AIRB), (5) International Financial Reporting Standard (e.g., IFRS 9), (6) probability of default (PD) Models, and (7) loss given default (LGD) models. The scenario data 274 may include data representing multiple scenarios in which credit risk modelling/analysis are often performed with large credit data based on a number of credit risk metrics.

The master node 200 may include a data manager 220 and an execution manager 240. The data manager 220 may be a software module, which may be executed by master node 200. The data manager 220 may be configured to access data from, or store data into, the database 270. In some embodiments, the data manager 220 may use a Structured Query Language (SQL) interface or module to access data from, or store data into, the database 270. The data manager 220 may create a distributed dataset or a distributed collection of data by partitioning data into partitions or columns of data.

The data manager 220 may include an array manager 230, which may be executed by master node 200. The array manager 230 may be configured to (1) convert or transform a portion of structured data (e.g., a set of columns in multiple rows in a logical table) into a logical array as a new column and (2) convert or transform a logical array back to a set of columns in multiple rows in the original table. In some embodiments, the logical array may be stored in memory (e.g., memory 360 in FIG. 3) in order to process the data in the array more efficiently. The array manager 230 may be implemented using one or more user-defined functions (UDFs). In some embodiments, the array manager 230 may define a new column-based function using a UDF and invoke the new column-based function on a plurality of columns in a logical table to convert or transform the data in the columns into an in-memory array. The array manager 230 may be implemented using one or more explode functions. In some embodiments, the array manager 230 may invoke one or more explode functions to convert or transform a logical array back to a set of columns in multiple rows in the original table. For example, the one or more explode functions may (1) convert the logical array to a plurality of (key, value) pairs and (2) convert the (key, value) pairs to the a set of columns in multiple rows in the original table.

The execution manager 240 may be a software module, which may be executed by master node 200. The execution manager 240 may be configured to perform pipelining transformations on the partitions or columns generated by the data manager 220, and then create a physical execution plan with set of (pipeline) stages to process the partitions or columns. In some embodiments, each stage may contain a plurality of execution units or tasks (e.g., execution unit 1 (280-1), execution unit 2 (280-2), . . . , execution unit M (280-M) where M is an integer greater than 1) so that each execution unit or task corresponding to a partition or column can be run on an execution node to which the partition or column is allocated. In some embodiments, the execution manager 240 may serialize a plurality of partitions or columns, and (2) send, ship or deliver the partitions or columns to the cluster manager 250.

The cluster manager 250 may be configured to configure and run one or more processes or applications on a cluster of execution nodes (working nodes or slave nodes). In some embodiments, the cluster manager may provide resources to execution nodes as need so that the execution nodes can operate accordingly. In some embodiments, the cluster manager 250 may be configured to (1) receive the serialized partitions or columns from the execution manager 240, (2) deserialize the partitions or columns, and (3) send, ship or deliver each partition or column to an execution node to which that partition or column is allocated. The cluster manager 250 may implemented in a computing system having similar configuration as that of the computing system 300 (see FIG. 3). In some embodiments, the cluster manager 250 may a software module, which may be executed by master node 200.

In response to (1) allocating by the data manager a partition or column to a particular execution node and (2) receiving the partition at the particular execution node, the particular execution node may be configured to execute a process or an application to process the partition or the column in a dedicated execution unit (or task). In some embodiment, a single execution unit or task may be generated for a single partition, so that the execution unit can be run inside a virtual machine (e.g., Java virtual machine) of an execution node to which that partition is allocated.

Figure 3:
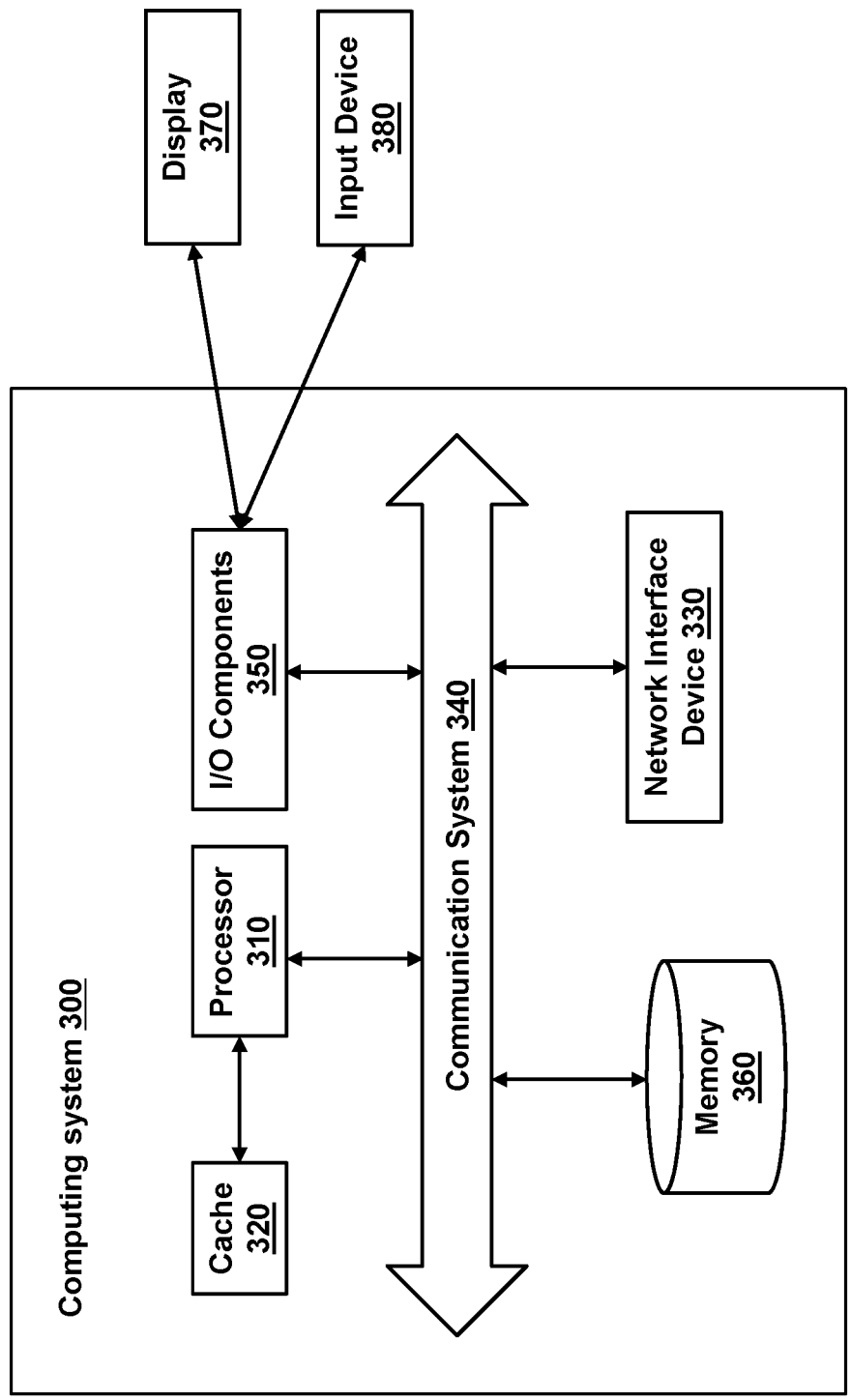
FIG. 3 is a block diagram showing an example of a computing system, according to an embodiment.

FIG. 3 is a block diagram showing an example of a computing system, according to some embodiments. An illustrated example computing system 300 includes one or more processors 310 in communication, via a communication system 340 (e.g., bus), with memory 360, at least one network interface controller 330 with network interface port for connection to a network (not shown), and other components, e.g., input/output ("I/O") components 350. Generally, the processor(s) 310 will execute instructions (or computer programs) received from memory. The processor(s) 310 illustrated incorporate, or are directly connected to, cache memory 320. In some instances, instructions are read from memory 360 into cache memory 320 and executed by the processor(s) 310 from cache memory 320.

In more detail, the processor(s) 310 may be any logic circuitry that processes instructions, e.g., instructions fetched from the memory 360 or cache 320. In many implementations, the processor(s) 310 are microprocessor units or special purpose processors. The computing device 300 may be based on any processor, or set of processors, capable of operating as described herein. The processor(s) 310 may be single core or multi-core processor(s). The processor(s) 310 may be multiple distinct processors.

The memory 360 may be any device suitable for storing computer readable data. The memory 360 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 300 may have any number of memory devices 360.

The cache memory 320 is generally a form of computer memory placed in close proximity to the processor(s) 310 for fast read times. In some implementations, the cache memory 320 is part of, or on the same chip as, the processor(s) 310. In some implementations, there are multiple levels of cache 320, e.g., L2 and L3 cache layers.

The network interface controller 330 manages data exchanges via the network interface (sometimes referred to as network interface ports). The network interface controller 330 handles the physical and data link layers of the OSI model for network communication. In some implementations, some of the network interface controller's tasks are handled by one or more of the processor(s) 310. In some implementations, the network interface controller 330 is part of a processor 310. In some implementations, the computing system 300 has multiple network interfaces controlled by a single controller 330. In some implementations, the computing system 300 has multiple network interface controllers 330. In some implementations, each network interface is a connection point for a physical network link (e.g., a cat-5 Ethernet link). In some implementations, the network interface controller 330 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 330 implements one or more network protocols such as Ethernet. Generally, a computing device 300 exchanges data with other computing devices via physical or wireless links through a network interface. The network interface may link directly to another device or to another device via an intermediary device, e.g., a network device such as a hub, a bridge, a switch, or a router, connecting the computing device 300 to a data network such as the Internet.

The computing system 300 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 300 may include an interface (e.g., a universal serial bus (USB) interface) for connecting input devices, output devices, or additional memory devices (e.g., portable flash drive or external media drive). In some implementations, a computing device 300 includes an additional device such as a co-processor, e.g., a math co-processor can assist the processor 310 with high precision or complex calculations.

The components 350 may be configured to connect with external media, a display 370, an input device 380 or any other components in the computing system 300, or combinations thereof. The display 370 may be a liquid crystal display (LCD), an organic light emitting diode (OLED), a flat panel display, a solid state display, a cathode ray tube (CRT), a projector, a printer or other now known or later developed display device for outputting determined information. The display 370 may act as an interface for the user to see the functioning of the processor(s) 310, or specifically as an interface with the software stored in the memory 360.

The input device 380 may be configured to allow a user to interact with any of the components of the computing system 300. The input device 380 may be a plurality pad, a keyboard, a cursor control device, such as a mouse, or a joystick. Also, the input device 380 may be a remote control, touchscreen display (which may be a combination of the display 370 and the input device 380), or any other device operative to interact with the computing system 300, such as any device operative to act as an interface between a user and the computing system 300.

FIG. 4 is a diagram depicting an example processing of inter-dependent data, according to some embodiments. A risk modelling/analysis system according to some embodiments (e.g., a system similar to risk modelling/analysis system 2000 but without an array manager 230; see FIG. 2) may calculate a loan amortization by performing column-by-column operations on a logical table whose rows represent monthly loan amortization schedules. The logical table has a plurality of columns 421-427 including C1 (month), C2 (interest rate), C3 (start balance), C4 (scheduled payment), C5 (interest paid), C6 (amortized amount), and C7 (end balance). The logical table has a plurality of rows R1, R2, R3, R4, and R5, which correspond to month 1, month 2, month 3, month 4, and month 5, respectively. This loan amortization schedule table has the same time-series dependencies as the dependencies 143-147 shown in FIG. 1. As shown in FIG. 4, the risk modelling/analysis system may input, from a logical table, rows R1 (411), R2 (412), R3 (413), R4 (414) and R5 (415), and pre-populate the rows R1 (411), R2 (412), R3 (413), R4 (414) and R5 (415) with non-time-series dependent data (e.g., data in the interest rates column C2; and data in the row R1 (411) of month 1; see an input table view 410 in FIG. 4). The system may then perform column-by-column operations to calculate values in each of the remaining rows based on a time-series dependency. Output table views 450 and 490 show results of these operations upon completion of calculating values in each row. For example, as shown in the output table view 450, values of R2 (412) may be calculated based on the time-series dependency on the previous row R1 (411). In this manner, similar calculations may be continued on the rows R3, R4, and R5, and as shown in the output table view 490, values of R3 (413), R4 (414), and R5 (415) may be calculated based on the time-series dependency on the corresponding previous rows R2 (412), R3 (413), and R4 (414), respectively. In this manner, the system can achieve performance improvement over inter-dependent data processing by row-by-row operations without spreading data/computation over a cluster of computing nodes (e.g., data processing shown in FIG. 1). However, this does not achieve better performance than inter-dependent data processing using an array or an explode function, because the system still needs to iterate through the rows 5 times, calculate inter-dependent values (e.g., the start balance and end balance for each month) one by one. Therefore, there is a need for further improving the performance of processing inter-dependent data.

FIG. 5 is a diagram depicting another example processing of inter-dependent data, according to some embodiments. A risk modelling/analysis system according to some embodiments (e.g., risk modelling/analysis system 2000 in FIG. 2) may calculate a loan amortization by performing column-by-column operations on a logical table whose rows represent monthly loan amortization schedules. The logical table has a plurality of columns 521-527 including C1 (month), C2 (interest rate), C3 (start balance), C4 (scheduled payment), C5 (interest paid), C6 (amortized amount), and C7 (end balance). The logical table has a plurality of rows R1, R2, R3, R4, and R5, which correspond to month 1, month 2, month 3, month 4, and month 5, respectively. This loan amortization schedule table has the same time-series dependencies as the dependencies 143-147 shown in FIG. 1. As shown in FIG. 5, the risk modelling/analysis system may input, from a logical table, rows R1 (511), R2 (512), R3 (513), R4 (514) and R5 (515), and pre-populate the rows R1 (511), R2 (512), R3 (513), R4 (514) and R5 (515) with non-time-series dependent data (e.g., data in the interest rates column C2; and data in the row R1 (511) of month 1; see an input table view 510 in FIG. 5). The system may then convert a plurality of columns (e.g., C2, C3, C4, C5, C6, C7), in which data in one or more columns in one row (e.g., C3, C4, C5, C6, C7 in a row) depend on data in one or more columns in another row (e.g., C7 in the previous row), into a logical array 535 as a single column C8 (528) in a single row R1 (531) (see an intermediate table view 530). In some embodiments, a risk modelling and analysis system can convert the plurality of columns in multiple rows (e.g., values of columns C2-C7 in rows R1-R5), into the logical array 535 using one or more user-defined functions (UDFs). A user of the system can define routines that process on one or more rows using UDFs. In some embodiments, the logical array 535 may be a one-dimensional array in memory (e.g., memory 360 in FIG. 3). For example, one or more UDFs may pre-populate an in-memory array A[.] including array elements A[1] through A[30], for example, with non-time-series dependent data as input data (e.g., data in the interest rates column C2 in the rows R1-R5; and data in the start balance column C3 in the row R1; see the intermediate table view 530 in FIG. 5).

Upon converting or pre-populating the input data into a logical array, the system can perform calculations of values in the array so as to separately handle or process inter-dependent portions (e.g., column data that is subject to dependency between rows) using the array. For example, as shown in an intermediate table view 550, the system can perform calculations of values in the in-memory array A[1]-A[30] based on the inter-dependency. Upon completion of the calculation with the array, the system can convert the (updated) array A[1]-A[30] back to the plurality of columns and rows in the original table (e.g., columns C2-C7 and rows R1-R5 as shown in an output table view 570 in FIG. 5) using an explode function. The system may use an explode function to map elements of the array (e.g., the array A[1]-A[30]) to data in corresponding columns and rows (e.g., data in columns C2-C7 and rows R1-R5). In some embodiments, an explode function can (1) map elements of the array to a plurality of rows having respective (key, value) pairs and then (2) map the (key value) pairs to data in corresponding columns and rows in the original table. For example, the explode function can (1) map values in A[1], A[2], A[3], A[4], A[5], A[6] to six pairs ("interest rate", 0.1189%), ("start balance", 1,832,066.78), ("scheduled payment", 7,165.08), ("interest paid", 2,178.20), ("amortized amount", 4,986.89), and ("end balance", 1,827,079.89), respectively; and then (2) map the six pairs to the row R1 with columns C2-C7 (0.1189%, 1,832,066.78, 7,165.08, 2,178.20, 4,986.89, 1,827,079.89), as shown in the output table view 570. In a similar manner, the explode function can map values in A[7]-A[30] to the rows R2-R5 with columns C2-C7, as shown in the output table view 570.

In some embodiments, a risk modelling and analysis system (e.g., system 2000 in FIG. 2) can spread or distribute both data and computations over clusters in columns or partitions, and perform column-by-column operations to achieve a substantial performance increase. As described above, the risk modelling and analysis system can (1) pre-populate the rows with non-time-series dependent data (the "interest rate" column C2 as non-time-series dependent data; see the input table view 510 in FIG. 5), (2) pre-populate one column with data (e.g., variable interest rates) using an array (see the intermediate table view 530 in FIG. 5), (3) perform a calculation on the array based on a time-series dependency by performing a column-by-column operation (see the intermediate table view 550 in FIG. 5), and (3) use an explode function to output time series data (based on the calculation results in the array) according to an original schema (e.g., columns and rows) of the logical table (see the output table view 570 in FIG. 5). In (2) performing the time-series dependent calculations, the system can take advantage of distributed computations over a cluster of computing nodes. In some embodiments, the system (e.g., master node 200 or risk modelling/analysis system 2000) can allocate or assign the data in the array and the time-series dependent calculations to an execution node (e.g., execution node 260-1 in FIG. 2) so that the execution node can execute the calculations in a dedicated execution unit (e.g., execution unit 1 (280-1) in FIG. 2) in the same execution node. In some embodiments, the system can assign calculations that are not subject to the time-series dependent calculations (e.g., (1) pre-populating the rows with non-time-series dependent data), to an execution unit other than the execution unit dedicated to the dependent calculations (e.g., execution unit other than execution unit 1 (280-1) in FIG. 2). For example, the process of (1) pre-populating the rows with non-time-series dependent data can be run in an execution unit on an execution node other than the execution node 260-1.

Figure 6:
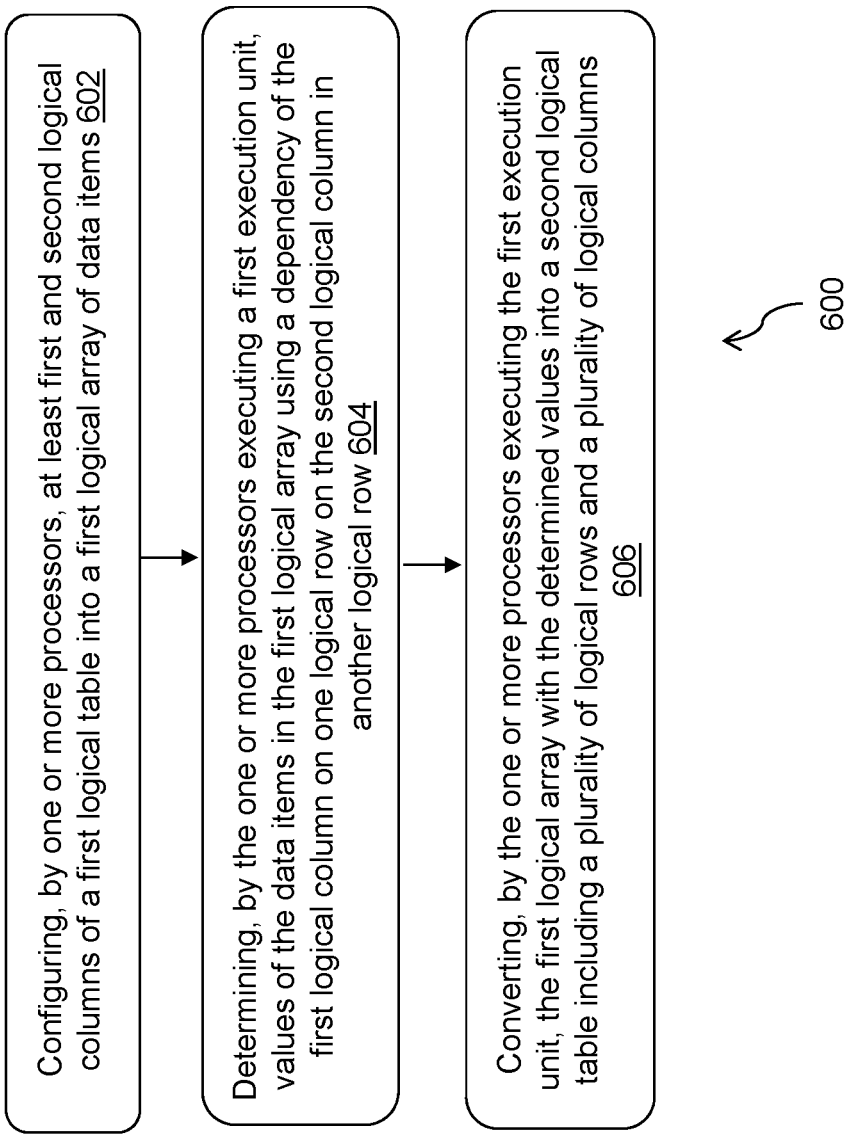
FIG. 6 is a flowchart illustrating a methodology for processing inter-dependent data, according to an embodiment.

FIG. 6 is a flowchart illustrating a methodology for processing inter-dependent data, according to some embodiments. FIG. 6 shows execution steps for processing inter-dependent data, according to a method 600. The method 600 may include execution steps 602, 604, and 608 performed in a risk modelling/analysis system (e.g., system 2000 in FIG. 2) including one or more processors (e.g., processor 310 in FIG. 3) and one or more memories (e.g., memory 360 in FIG. 3). The one or more memories may be configured in a first logical table (e.g., logical table shown in the view 510 in FIG. 5) including a plurality of logical rows (e.g., R1-R5 in FIG. 5) and a plurality of logical columns (e.g., C1-C7 in FIG. 5). A value of a data item in a first logical column in each logical row (e.g., data in the start balance column C3 in the rows R1-R5 in FIG. 5) may be determined based on a dependency (e.g., dependency 143 in FIG. 1) of the first logical column (e.g., column C3 of the row R5) on a second logical column in another logical row (e.g., the end balance column C7 in the previous row R4). The data items in the first logical table (e.g., data in the logical table shown in the view 570 in FIG. 5) may include time-series data (e.g., monthly loan amortization data). Data items in the plurality of rows of the first logical table (e.g., rows R1-R5 in FIG. 5) may be associated with different time points from each other (e.g., month 1 through month 5 in FIG. 5). It should be understood that the steps described herein are merely illustrative and additional or substitute steps should also be considered to be within the scope of this disclosure. Furthermore, methods with a fewer numbers of steps should also be considered to be within the scope of this disclosure.

At step 602, the one or more processors may be configured to configure at least the first and second logical columns of the first logical table (e.g., columns C3 and C7 in FIG. 5) into a first logical array of data items (e.g., array 535 in FIG. 5). The dependency may further include a dependency (e.g., dependency 145 in FIG. 1) of a fourth logical column (e.g., column C5 in FIG. 5) on the first logical column (e.g., column C3 in FIG. 5) in the same logical row. In configuring the at least the first and second logical columns into the first logical array, the one or more processors may be configure at least the first, second and fourth logical columns of the first logical table into the first logical array of data items. For example, as shown in FIG. 5, the columns C3, C5 and C7 are configured or included in the logical array 535 because there are dependencies among the columns C3, C5 and C7.

At step 604, the one or more processors may be configured to determine, by executing a first execution unit (e.g., execution unit 1 (280-1) in FIG. 2), values of the data items in the first logical array (e.g., data in the array 535) using the dependency (e.g., dependencies 143, 144, 145, 146, 147 in FIG. 1). The one or more processors may be configured to determine the values of the data items in the first logical array by executing a user defined function (e.g., a UDF in the array manager 230 in FIG. 2). The values of the data items in the first logical array determined using the dependency may include values relating to a loan amortization process (e.g., C2 (interest rate), C3 (start balance), C4 (scheduled payment), C5 (interest paid), C6 (amortized amount), and C7 (end balance) in FIG. 5).

The one or more processors may be further configured to determine, by executing a second execution unit different from the first execution unit (e.g., an execution unit other than the execution unit 1 (280-1) in FIG. 2), values of data items in a third logical column of the first logical table, which are not subject to the dependency (the "interest rate" column C2 as non-time-series dependent data; see the input table view 510 in FIG. 5). The first execution unit and the second execution unit may be executed in parallel. The first execution unit and the second execution unit may be executed on different nodes in a cluster of computers.

At step 606, the one or more processors may be configured to convert, by executing the first execution unit (e.g., execution unit 1 (280-1) on execution node 260-1 in FIG. 2), the first logical array (e.g., array 535 in FIG. 5) with the determined values (see the intermediate table view 550 in FIG. 5) into a second logical table including a plurality of logical rows and a plurality of logical columns (see the output table view 570 in FIG. 5). The one or more processors may be configured to convert the first logical array with the determined values into the second logical table by executing an explode function (e.g., an explode function in the array manager 230 in FIG. 2).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of processing data items in one or more memories configured in a first logical table including a plurality of logical rows and a plurality of logical columns, wherein a value of a data item in a first logical column in each logical row is determined based on a dependency of the first logical column on a second logical column in another logical row, the method comprising:
   configuring, by one or more processors, at least the first and second logical columns of the first logical table into a first logical array of data items;
   determining, by the one or more processors executing a first execution node, values of the data items in the first logical array using the dependency; and
   responsive to determining, by the one or more processors, an allocation of the values of the data items in the first logical array to a first execution node of a plurality of execution nodes and values of the data items in a second logical array to a second execution node of the plurality of execution nodes according to the dependency,
      converting, by the one or more processors executing the first execution node of the allocation, the first logical array with the determined values of the data items into the second logical array of the second execution node of the allocation to improve performance of processing the first logical array and the second logical array, the second logical array comprises a second logical table that includes a plurality of logical rows and a plurality of logical columns using a function configured to:
         convert the first logical array with the determined values into a plurality of key-value pairs; and
         convert the plurality of key-value pairs into the plurality of columns and the plurality of rows in the second logical table by mapping the key-value pairs to the plurality of logical rows and the plurality of logical columns of the first logical table.

2. The method according to claim 1, wherein the values of the data items in the first logical array are determined by executing a user defined function.

3. The method according to claim 1, further comprising:
   determining, by the one or more processors executing the second execution node different from the first execution node, values of data items in a third logical column of the first logical table that are not subject to the dependency.

4. The method according to claim 3, wherein the first execution node and the second execution node are executed in parallel.

5. The method according to claim 3, wherein the first execution node and the second execution node are executed on different nodes of the plurality of nodes in a cluster of computers.

6. The method according to claim 1, wherein the dependency further comprises a dependency of a fourth logical column on the first logical column in the same logical row, and
   configuring the at least the first and second logical columns into the first logical array comprises configuring at least the first, second and fourth logical columns of the first logical table into the first logical array of data items.

7. The method according to claim 1, wherein the data items in the first logical table include time-series data.

8. The method according to claim 7, wherein data items in the plurality of rows of the first logical table are associated with different time points from each other.

9. The method according to claim 1, wherein the values of the data items in the first logical array determined using the dependency include values relating to a loan amortization process.

10. A system for processing data items, comprising:
    one or more memories configured in a first logical table including a plurality of logical rows and a plurality of logical columns, wherein a value of a data item in a first logical column in each logical row is determined based on a dependency of the first logical column on a second logical column in another logical row; and
    one or more processors configured to:
       configure at least the first and second logical columns of the first logical table into a first logical array of data items;
       determine, by executing a first execution node, values of the data items in the first logical array using the dependency; and
       responsive to determining an allocation of the values of the data items in the first logical array to a first execution node of a plurality of execution nodes and values of the data items in a second logical array to a second execution node of the plurality of execution nodes according to the dependency,
          convert, by executing the first execution node of the allocation, the first logical array with the determined values of the data items into the second logical array of the second execution node of the allocation, the second logical array comprises a second logical table that includes to improve performance of processing of the first logical array and the second logical array, a plurality of logical rows and a plurality of logical columns using a function configured to:
             convert the first logical array with the determined values into a plurality of key-value pairs; and
             convert the plurality of key-value pairs into the plurality of columns and the plurality of rows in the second logical table by mapping the key-value pairs to the plurality of logical rows and the plurality of logical columns of the first logical table.

11. The system according to claim 10, wherein the one or more processors are configured to determine the values of the data items in the first logical array by executing a user defined function.

12. The system according to claim 10, the one or more processors are further configured to:
   determine, by executing a second execution node different from the first execution node, values of data items in a third logical column of the first logical table that are not subject to the dependency.

13. The system according to claim 12, wherein the first execution node and the second execution node are executed in parallel.

14. The system according to claim 12, wherein the first execution node and the second execution node are executed on different nodes of a plurality of nodes in a cluster of computers.

15. The system according to claim 10, wherein the dependency further comprises a dependency of a fourth logical column on the first logical column in the same logical row, and
   in configuring the at least the first and second logical columns into the first logical array, the one or more processors configure at least the first, second and fourth logical columns of the first logical table into the first logical array of data items.

16. The system according to claim 10, wherein the data items in the first logical table include time-series data.

17. The system according to claim 16, wherein data items in the plurality of rows of the first logical table are associated with different time points from each other.

18. The system according to claim 10, wherein the values of the data items in the first logical array determined using the dependency include values relating to a loan amortization process.

* * * * *